(12) United States Patent
Williams et al.

(10) Patent No.: US 10,108,608 B2
(45) Date of Patent: Oct. 23, 2018

(54) DIALOG STATE TRACKING USING WEB-STYLE RANKING AND MULTIPLE LANGUAGE UNDERSTANDING ENGINES

(71) Applicant: MICROSOFT TECHNOLOGY LICENSING, LLC, Redmond, WA (US)

(72) Inventors: Jason D. Williams, Seattle, WA (US); Geoffrey G. Zweig, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/303,395

(22) Filed: Jun. 12, 2014

(65) Prior Publication Data
US 2015/0363393 A1 Dec. 17, 2015

(51) Int. Cl.
*G06F 17/20* (2006.01)
*G06F 17/28* (2006.01)
*G10L 15/22* (2006.01)
*G10L 15/06* (2013.01)

(52) U.S. Cl.
CPC .......... *G06F 17/289* (2013.01); *G10L 15/063* (2013.01); *G10L 15/22* (2013.01); *G10L 2015/0635* (2013.01)

(58) Field of Classification Search
USPC .................................................. 704/8–9
See application file for complete search history.

(56) References Cited

U.S. PATENT DOCUMENTS 6,275,801 B1 * 8/2001 Novak .................... G10L 15/08
704/252
7,013,275 B2 3/2006 Arnold et al.
7,292,976 B1 * 11/2007 Hakkani-Tur ........ G06F 17/277
704/231

(Continued)

OTHER PUBLICATIONS

Bohus, et al., "K "Hypotheses + Other" Belief Updating Model", In Proceedings of AAAI Workshop on Statistical and Empirical Approaches for Spoken Dialogue Systems, Jul. 17, 2006, 6 pages.

(Continued)

*Primary Examiner* — Kevin Ky
(74) *Attorney, Agent, or Firm* — Merchant & Gould

(57) ABSTRACT

A dialog state tracking system. One aspect of the system is the use of multiple utterance decoders and/or multiple spoken language understanding (SLU) engines generating competing results that improve the likelihood that the correct dialog state is available to the system and provide additional features for scoring dialog state hypotheses. An additional aspect is training a SLU engine and a dialog state scorer/ranker DSR engine using different subsets from a single annotated training data set. A further aspect is training multiple SLU/DSR engine pairs from inverted subsets of the annotated training data set. Another aspect is web-style dialog state ranking based on dialog state features using discriminative models with automatically generated feature conjunctions. Yet another aspect is using multiple parameter sets with each ranking engine and averaging the rankings. Each aspect independently improves dialog state tracking accuracy and may be combined in various combinations for greater improvement.

20 Claims, 13 Drawing Sheets

(56) References Cited

U.S. PATENT DOCUMENTS

| | | | |
|---|---|---|---|
| 7,562,014 B1* | 7/2009 | Hakkani-Tur | G06F 17/277 704/231 |
| 7,933,766 B2 | 4/2011 | Gupta et al. | |
| 8,140,328 B2 | 3/2012 | Williams | |
| 8,909,534 B1* | 12/2014 | Heath | G10L 15/06 704/243 |
| 2004/0267785 A1* | 12/2004 | Suontausta | G06F 17/30625 |
| 2006/0149544 A1 | 7/2006 | Hakkani-Tur et al. | |
| 2006/0190253 A1* | 8/2006 | Hakkani-Tur | G10L 15/063 704/243 |
| 2006/0259302 A1* | 11/2006 | Lewis | G10L 15/1815 704/255 |
| 2009/0030683 A1 | 1/2009 | Williams | |
| 2010/0138215 A1 | 6/2010 | Williams | |
| 2011/0010164 A1 | 1/2011 | Williams | |
| 2013/0060763 A1* | 3/2013 | Chica | G06F 17/30699 707/723 |
| 2014/0156268 A1 | 6/2014 | Arizmendi et al. | |
| 2014/0163959 A1* | 6/2014 | Hebert | G06F 17/2785 704/9 |
| 2014/0343940 A1* | 11/2014 | Yassa | G10L 15/26 704/235 |
| 2015/0142420 A1* | 5/2015 | Sarikaya | G06F 17/279 704/9 |

OTHER PUBLICATIONS

Burges, et al., "From Ranknet to Lambdarank to Lambdamart: An Overview", In Technical Report MSR-TR-2010-82, Jun. 23, 2010, pp. 1-19.

Chapelle, et al., "Yahoo! Learning to Rank Challenge", In JMLR Workshop and Conference Proceedings, Retrieved on: Apr. 29, 2014, pp. 1-24.

Henderson, et al., "Discriminative Spoken Language Understanding using Word Confusion Networks", In Proceedings of IEEE Workshop on Spoken Language Technologies, Dec. 2, 2012, 6 pages.

Henderson, et al., "Dialog State Tracking Challenge 2 & 3", In Technical report, Sep. 2013, pp. 1-22.

Henderson, et al., "Deep Neural Network Approach for the Dialog State Tracking Challenge", In Proceedings of the SIGDIAL Conference, Aug. 2013, 5 pages.

Horvitz, et al., "A Computational Architecture for Conversation", In Proceedings of the Seventh International Conference on User Modeling, Jun. 1, 1999, 10 pages.

Lee, et al., "Recipe for Building Robust Spoken Dialog State Trackers: Dialog State Tracking Challenge System Description", In Proceedings of the SIGDIAL Conference, Aug. 22, 2013, pp. 414-422.

Lee, Sungjin, "Structured Discriminative Model for Dialog State Tracking", In Proceedings of the SIGDIAL Conference, Aug. 22, 2013, pp. 442-451.

Metallinou, et al., "Discriminative State Tracking for Spoken Dialog Systems", In Proceedings of the 51st Annual Meeting of the Association for Computational Linguistics, Aug. 4, 2013, pp. 466-475.

Thomson, et al., "Bayesian Update of Dialogue State: A POMDP Framework for Spoken Dialogue Systems", In Journal of Computer Speech and Language, vol. 24, Issue 4, Oct. 2010, pp. 562-588.

Thomson, et al., "Evaluating Semantic-level Confidence Scores with Multiple Hypotheses", In Proceedings of 9th Annual Conference of the International Speech Communication Association, Sep. 22, 2008, 4 pages.

Wang, et al., "A Simple and Generic Belief Tracking Mechanism for the Dialog State Tracking Challenge: On the Believability of Observed Information", In Proceedings of the SIGDIAL Conference, Aug. 22, 2013, pp. 423-432.

Williams, et al., "Partially Observable Markov decision Processes for Spoken Dialog Systems", In Proceedings of Computer Speech and Language, vol. 21, No. 2, Apr. 2007, pp. 393-422.

Williams, et al., "The Dialog State Tracking Challenge", In Proceedings of the SIGDIAL Conference, Aug. 22, 2013, pp. 404-413.

Williams, Jason D., "Challenges and Opportunities for State Tracking in Statistical Spoken Dialog Systems: Results from Two Public Deployments", In IEEE Journal of Selected Topics in Signal Processing, vol. 6, No. 8, Dec. 2012, pp. 1-12.

Wu, et al., "Adapting Boosting for Information Retrieval Measures", In Journal of Information Retrieval, vol. 13, Issue 3, Jun. 2010, pp. 1-17.

Young, et al., "The Hidden Information State Model: A Practical Framework for POMDP-Based Spoken Dialogue Management", In Proceedings of Computer Speech and Language, Apr. 2010, pp. 1-25.

Zilka, et al., "Comparison of Bayesian Discriminative and Generative Models for Dialogue State Tracking", In Proceedings of the SIGDIAL Conference, Aug. 22, 2013, pp. 452-456.

Williams, et al., "The Dialog State Tracking Challenge", In Proceedings of 14th Annual Meeting of the Special Interest Group on Discourse and Dialogue, Aug. 22, 2013, 10 pages.

Williams, Jason D., "Exploiting the ASR N-Best by tracking multiple dialog state hypotheses", In Proceedings of 9th Annual Conference of the International Speech Communication Association, Sep. 22, 2008, 4 pages.

Williams, Jason D., "Spoken dialog systems as an application of planning under uncertainty", In Proceedings of 21st International Conference on Automated Planning and Scheduling, Jun. 2011, 77 pages.

"International Search Report and Written Opinion Issued in PCT Application No. PCT/US2015/034615", dated Aug. 14, 2015, 14 Pages.

"International Preliminary Report on Patentability Issued in PCT Application No. PCT/US2015/034615", dated May 20, 2016, 7 Pages.

* cited by examiner

DIALOG STATE TRACKING USING WEB-STYLE RANKING AND MULTIPLE LANGUAGE UNDERSTANDING ENGINES

BACKGROUND

Spoken dialog systems interact with users via spoken language to help them achieve a goal. For input, spoken dialog systems rely on automatic speech recognition (ASR) to convert speech to words, and spoken language understanding (SLU) translate the words to determine the local meaning, which is the meaning contained in the user's speech in a turn. However, ASR and SLU are prone to errors. If unchecked, errors substantially erode the user experience and can ultimately render a dialog system useless. Even seemingly low error rates are problematic in dialog systems. For example, if recognition errors occur in only 5% of turns and the average dialogs is 20 turns, the majority of dialogs (65%) contain at least one error. Acknowledging the possibility of errors, the ASR and SLU output alternatives on a list called the N-best list, in addition to their best guess.

Dialog state tracking overcomes a large fraction of recognition errors in spoken dialog systems; however, aspects of dialog state tracking are still problematic. The two main approaches used in dialog state tracking are generative models and discriminative models. Generative models, such as n-gram models, Naïve Bayes classifiers, and hidden Markov models, rely on the joint probability of concepts and semantic constituents of an utterance to determine meaning. In contrast, discriminative models learn a classification function based on conditional probabilities of concepts given the semantic constituents of an utterance.

In general, the technical problem addressed is improving accuracy in statistical dialog state tracking. It is with respect to these and other considerations that the present invention has been made. Although relatively specific problems have been discussed, it should be understood that the aspects disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of a dialog state tracking system and accompanying method include the use of multiple automatic speech recognizer (ASR) engines and/or multiple spoken language understanding (SLU) engines. In the presence of errors, such as misrecognition of the utterance, each additional ASR or SLU engine improves the chance that the set of dialog state hypotheses considered by the dialog state tracking system will include the correct dialog state. If the correct dialog state is not present in the set of dialog state hypotheses, there is effectively no way for the dialog system to understand the user's goal and respond appropriately. Further, each additional ASR or SLU engine provides additional features for scoring each dialog state.

Each SLU may be paired with a dialog state scorer/ranker (DSR) engine. An additional aspect is training a SLU/DSR pair using different subsets from a single annotated training data set. The training data set may be split into multiple parts corresponding to the number of SLU/DSR pairs to be trained. The SLU engine is trained using a first part of the training data set. The dialog state scoring/ranking model is trained with the other part of the training data set. The data set parts may be inverted and the process repeated to train an additional SLU/DSR pair. Further, two additional DSRs may be trained using by using different training parameters.

Another aspect is the use of web-style dialog state ranking based on dialog state features using discriminative models with automatically generated feature conjunctions. This may be accomplished through the use of web-style (i.e., learning-to-rank) algorithms to build dialog state ranking models in place of conventional generative or discriminative dialog scoring methods. The objective of web-style ranking tasks is to order a set of N documents by relevance given a query. The input to a web-style ranking algorithm is a query Q and a set of documents $X=\{D_1, \ldots, D_N\}$, where each document is described in terms of features of that document and the query $\phi(D_i,Q)$. The output is a score for each document, where the highest score indicates the most relevant document. Dialog state ranking adapts web-style ranking to rank features associated with dialog states $\phi(X_i)$ instead of document features and queries $\phi(D_i,Q)$. Web-style ranking algorithms allow conjunctions of features to be automatically built.

The aspects of the dialog state tracking system may be implemented by one or more of the SLU module, the dialog manager, and the ASR. Accordingly, the dialog state tracking system may incorporate the SLU module, portions of the dialog manager, and, optionally, the ASR. Each aspect independently improves dialog state tracking accuracy and may be combined in various combinations for greater improvement.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various aspects of the present invention are described more fully below with reference to the accompanying drawings, which form a part hereof, and which show specific exemplary aspects of the present invention. However, the present invention may be implemented in many different forms and should not be construed as limited to the aspects set forth herein; rather, these aspects are provided so that this disclosure will be thorough and complete, and will fully convey the scope of the various aspects to those skilled in the art. Aspects may be practiced as methods, systems, or devices. Accordingly, implementations may be practiced using hardware, software, or a combination of hardware and software. The following detailed description is, therefore, not to be taken in a limiting sense.

Aspects of a dialog state tracking system and accompanying method are described herein and illustrated in the accompanying figures. One aspect of the system is the use of multiple ASRs and/or multiple SLU engines generating competing results that improve the likelihood that the correct dialog state is available to the system and provide additional features for scoring dialog state hypotheses. An additional aspect is training a SLU engine and a DSR engine using different subsets from a single annotated training data set. A further aspect is training multiple SLU/DSR pairs from inverted subsets of the annotated training data set. Another aspect is the use of web-style dialog state ranking based on dialog state features using discriminative models with automatically generated feature conjunctions. Further aspects include training each dialog state ranking engine using multiple parameter sets to produce additional ranking engines and averaging the rankings obtained from multiple ranking engines. Each aspect independently improves dialog state tracking accuracy and may be combined in various combinations for greater improvement.

The dialog state tracking system described herein is applicable to dialog systems using a wide variety of modalities, both input and output, such as speech, text, touch, gesture, and combinations thereof (e.g., multi-mode dialog systems). As used herein, the term "utterances" broadly encompasses any type of conversational input including, but not limited to, speech, text entry, touch, and gestures. References to or depictions of any modality-specific dialog system or conversational inputs should be read broadly to encompass other modalities or conversational inputs along with the corresponding hardware and/or software modifications to implement other modalities. References to and depictions of a spoken dialog system are merely illustrative of one suitable implementation of a dialog system modality benefiting from the dialog state tracking system described herein and should not be construed as limiting the scope to speech modalities or a single modality.

Figure 1:
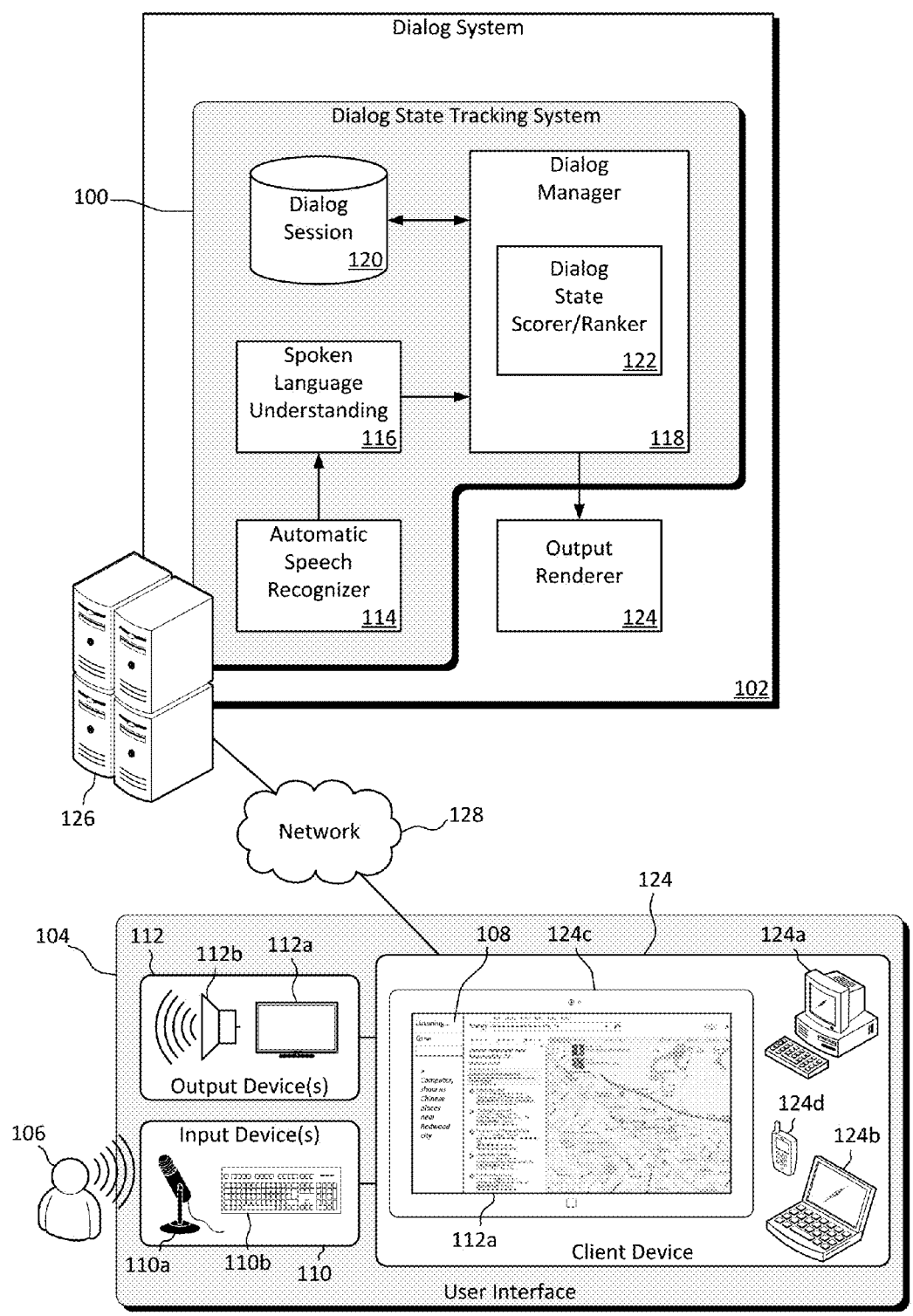
FIG. 1 is a system diagram illustrating aspects of a dialog state tracking system.

FIG. 1 is a system diagram illustrating aspects of the dialog state tracking system. The dialog state tracking system 100 is illustrated in the context of a dialog system 102, such a spoken dialog system. The dialog system 102 includes a user interface 104 accepting inputs from a user 106. The user interface 104 may include software components, such as a user agent 108 (i.e., a client application), and/or hardware components facilitating interaction with the user agent 108 and/or the dialog system 102. For example, the user interface 104 may include one or more input devices 110 for accepting user utterances, such as a microphone 110a for accepting audio inputs (i.e., spoken utterances) or a keyboard 110b (physical or virtual via a touchscreen) for accepting text inputs (i.e., typed utterances). Similarly, the user interface 104 may include one or more output devices 112 for rendering the output of a dialog system 102, such as a display screen 112a for producing visual outputs and/or an audio transducer 112b (e.g., a speaker) for generating audible outputs (e.g., computer generated speech).

The dialog system 102 may include an automatic speech recognizer (ASR) module 114 (i.e., an utterance decoder) that converts spoken utterances into computer readable text for processing by the dialog system 102. Because speech recognition is prone to error, the recognition result may contain multiple textual representations corresponding to possible recognition results for a spoken utterance and presented as weighted alternatives. For example, the ASR module 114 may generate a N-best list or a word confusion network. The ASR module 114 of the dialog state tracking system 100 may contain one or more ASR engines, as described herein.

A spoken language understanding (SLU) module 116 converts the ASR module output into a meaning representation corresponding to the user utterance. The SLU module 116 disassembles and parses the computer readable text. The computer readable text is converted into semantic representations that may be understood and processed by a machine. As with the ASR output, the meaning representation may contain alternative meanings for the computer readable text. The SLU module 116 of the dialog state tracking system 100 may contain one or more SLU engines, as described herein.

A dialog manager 118 acts on the output of the SLU module 116. The dialog manager 118 is a stateful component of the dialog system 102 that is ultimately responsible for the flow of the dialog (i.e., conversation). The dialog manager 118 keeps track of the conversation by updating the dialog session 120 to reflect the current dialog state, controls the flow of the conversation, and performs appropriate machine actions based on the current dialog state. (i.e., participates in the conversation/responds to the user). The dialog session 120 is a data set that may store any and all aspects of the interaction between the user 106 and the dialog system 102. The types and amount of dialog state information stored by the dialog session 120 may vary based on the design and complexity of the dialog system 102. For example, basic dialog state information stored by most dialog systems includes, but is not limited to, the utterance history, the last command from the user, and the last machine action, and the current dialog state.

The dialog manager 118 enumerates a set of dialog state hypotheses based on the output of the SLU module 116 and extracts features from the output from the SLU module 116, the dialog session 120, and, optionally, the ASR module 114 to track the dialog state. The dialog state hypotheses may be enumerated in a flat list, or in other structures such as a set of partitions. A dialog state scorer/ranker (DSR) module 122 scores or ranks the dialog state hypotheses based on the extracted features. The dialog manager 118 selects the highest scoring or ranking dialog state hypotheses as the current dialog state, performs the appropriate machine action corresponding to the current dialog state, and updates the dialog session 120. The DSR module 122 of the dialog state tracking system 100 may contain one or more DSR engines, as described herein.

An output renderer 124 generates an output communicating the response of the dialog system 102, which may be presented to the users via the user agent. The output generator optionally includes an optional natural language generation component that converts the response into natural (i.e., human) sounding text for presentation to the users. The output generator optionally includes a text-to-speech component that translates the natural language output into speech and allows the dialog system 102 to verbally interact with the users. The output is rendered to the user via one or more of the output devices of the client device.

Aspects of the dialog state tracking system 100 may be implemented by one or more of the SLU module 116, the dialog manager 118, and the ASR 114. Accordingly, the dialog state tracking system 100 may incorporate the SLU module 116, portions of the dialog manager 118, and, optionally, the ASR 114.

The components of the dialog system 100, including the user interface, the ASR module 114, the SLU module 116, and the dialog manager 118, including the DSR module 122, may be implemented in a single computing device. Alternatively, some or all of the dialog system components may be implemented as part of various computing devices in a distributed computing environment. For example, the user interface 104 may be implemented in a client device 124 (e.g., a user's personal computing device) while the remaining dialog system components are implemented using one or more remote computing devices 126 (e.g., a server or server farm) in communication with the client device via a network 128, such as a local area network, a wide area network, or the Internet. The client device and the remote computing devices may be implemented as computing devices, such as, but not limited to, server or desktop computers 124a, laptops 124b, tablet computers 124c, smartphones 124d, smart watches, smart appliances, vehicle entertainment or navigation systems, video game systems, and consumer electronic devices.

Figure 2:
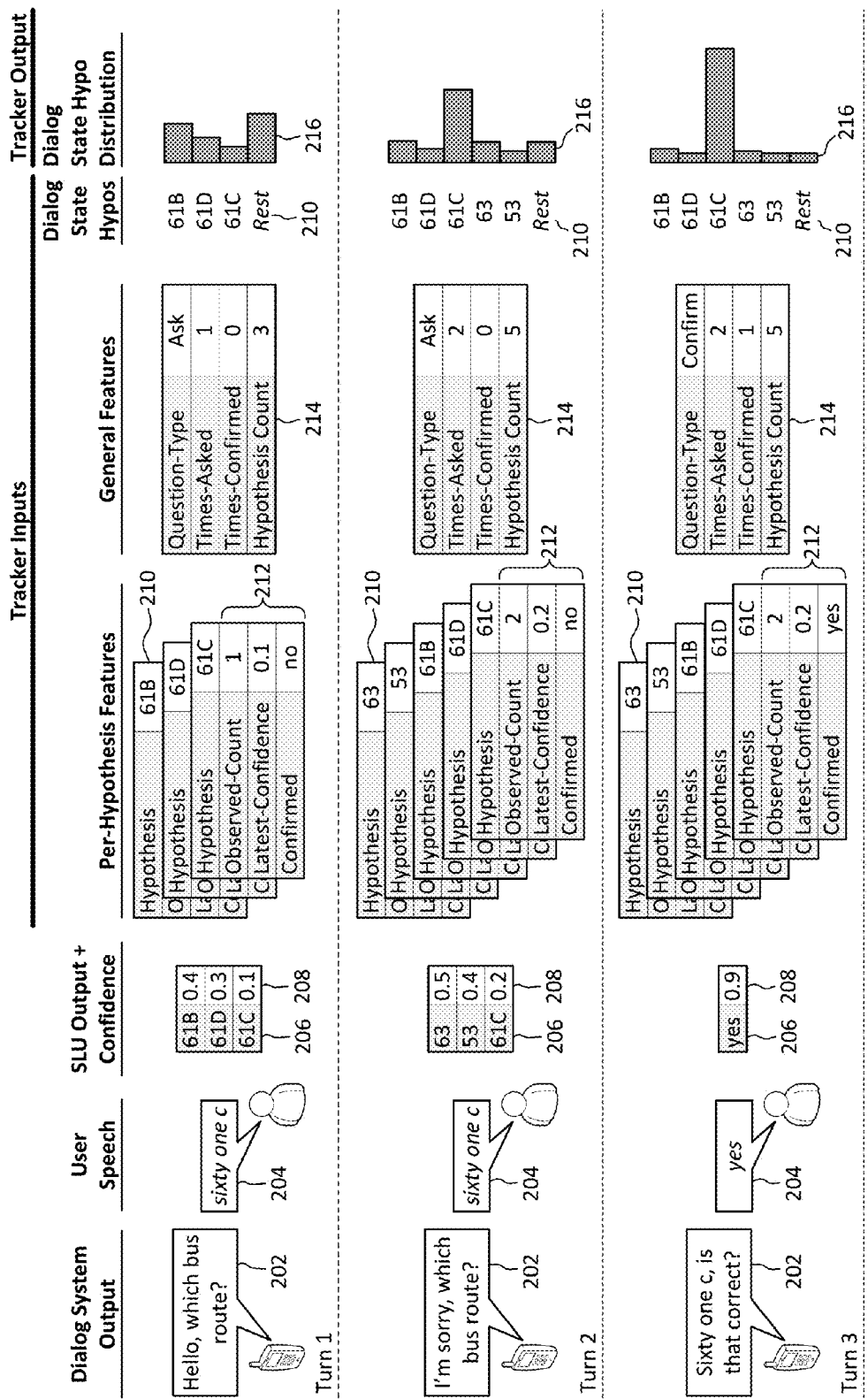
FIG. 2 provides an overview of dialog state tracking.

FIG. 2 provides an overview of dialog state tracking using a bus schedule information system as an example. The dialog state might indicate the user's desired bus route, origin, and destination. As previously mentioned, dialog state tracking is difficult because automatic speech recognition and spoken language understanding errors are common, and can cause the system to misunderstand the user's needs. At the same time, state tracking is crucial because the system relies on the estimated dialog state to choose actions—for example, which bus schedule information to present to the user.

The dialog state tracking problem can be formalized as follows. Each system turn in the dialog is one data point. For each data point, the input consists of three items: a set of K features that describes the current dialog context, G dialog state hypotheses, and, for each dialog state hypothesis, H features that describe that dialog state hypothesis.

In the depicted example, the dialog state contains the user's desired bus route. At each turn, the system produces a spoken output 202. The user's spoken response 204 is processed to extract a set of spoken language understanding results 206, each with a local confidence score 208. A set of G dialog state hypotheses 210 is formed by considering all SLU results observed so far, including the current turn and all previous turns. In the example, three dialog state hypotheses (G=3) are initially produced in turn 1, but as the dialog continues, the set of dialog state hypotheses 210 expands to five (G=5). For each state hypothesis, a feature extractor produces a set of hypothesis-specific features 212 (H=3), plus a single set general features 214 that describes the current dialog context (K=4). The dialog state tracking system uses these features to produce a distribution 216 over the dialog state hypotheses, plus a meta-hypothesis denoted "rest" which accounts for the possibility that none of the dialog state hypotheses 210 are correct.

Some of the issues with conventional dialog state scoring approaches described previously may be illustrated using FIG. 2. For example, a generative model might fail to assign the highest score to the correct hypothesis (61C) after the second turn. In contrast, conventional discriminative approaches, while generally producing more accurate distributions, are only capable of tracking a limited number of dialog state hypotheses. As a result, a conventional discriminative model may consider more features, but only for the top two SLU results. The remaining results, including the correct hypothesis (61C), may be discarded, and, thus, are not available to be selected as the correct hypothesis.

Aspects of the dialog state tracking system 100 described herein include the use of multiple SLU engines. The use of multiple SLU engines involves modification to various aspects of conventional dialog state tracking approaches, but offers several advantages. First, adding SLU engines potentially increases the number of available dialog state hypotheses because the output of each SLU engine is dependent on their individual models/approaches. Second, each additional SLU engine provides additional features for scoring each dialog state both from differences in the output and information derived from the availability of competing outputs.

In the presence of errors, such as misrecognition of the utterance, each additional SLU engine improves the chance that the set of dialog state hypotheses considered by the dialog state tracking system 100 will include the correct dialog state. If the correct dialog state is not present in the set of dialog state hypotheses, there is effectively no way for the dialog system 102 to understand the user's goal and respond appropriately.

Further, each additional SLU engine provides additional features for scoring each dialog state. For example, each SLU engine may produce a confidence score with the output. If two separate SLU engines generate the same output, but one confidence score is high and the other confidence score is low, the disagreement indicates high level of uncertainty in dialog states containing that output. Conversely, if both confidence scores are high, the agreement indicates a high level of certainty in dialog states containing that output. In other words, features such as agreement or disagreement between the competitive outputs of multiple SLU engines provides additional information that increases precision when scoring dialog states. Using two SLU engines significantly increases the number of features per joint goal. In testing, the number of features per joint goal increased from 1964 to 3140 when a second SLU engine was added to the dialog state tracking system 100.

Figure 3A:
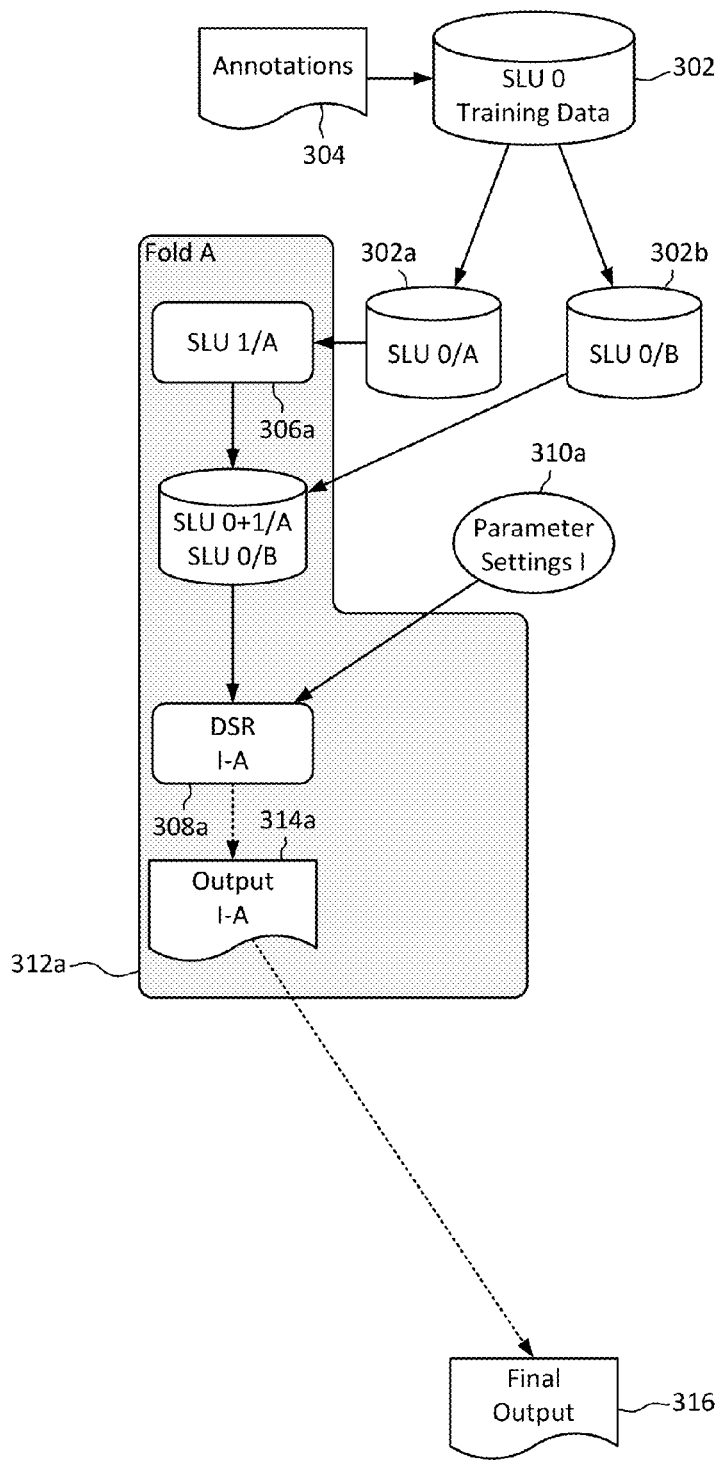
FIGS. 3A-C are schematics showing a scalable approach for training pairs of SLUs and DSRs to implement aspects of the present invention.

FIG. 3A is a schematic showing a scalable approach for training pairs of SLUs and DSRs to implement aspects of the present invention. An aspect of using multiple SLUs is an approach for training multiple SLUs and DSRs using a single training data set 302. The solid lines represent activities occurring during training. The broken lines represent activities occurring at runtime.

The training data set 302 collected from a baseline SLU engine, designated herein as SLU 0. The training data set 302 may include query/document pairs labeled with annotations 304 regarding the aspects of the dialog state at each turn. For example, the annotations may describe the relevance of the query/document pairs using several levels, such as, "excellent," "good," "fair," and "not relevant." In the context of the dialog state ranking, the annotation levels may also be simplified to "correct" and "not correct." When using multiple SLU engines, training each SLU/DSR pair using the same data produces an unwanted bias. The bias may be avoided by dividing the data into parts and training each SLU/DSR pair using a unique combination of parts. The number of parts may be selected based on the number of folds to be trained, provided enough training data is available so each part contains enough data to meaningfully train the statistical models. For example, splitting the training data in half would allow training of one or two folds, splitting the training data in thirds would allow training of one to three folds, and so on.

The training data set 302 may be split into multiple parts corresponding to the number of SLU/DSR pairs to be trained. For example, as illustrated, when training two SLU engines, the training data set 302 is split into two parts, part A 302a and part B 302b. The training data set 302 may be divided into substantially equal parts. A first SLU model 306a is trained using training data set part A 302a using a first SLU engine. A first dialog state scoring/ranking model 308a is trained with training data set part B 302b and a training parameter set 310a. This arrangement is designated fold A 312a. The output 314a of the fold is the scored/ranked dialog state hypotheses from which the current dialog state may be selected. For a single fold, the output 314a of the fold is the final DSR output 316.

Figure 3B:
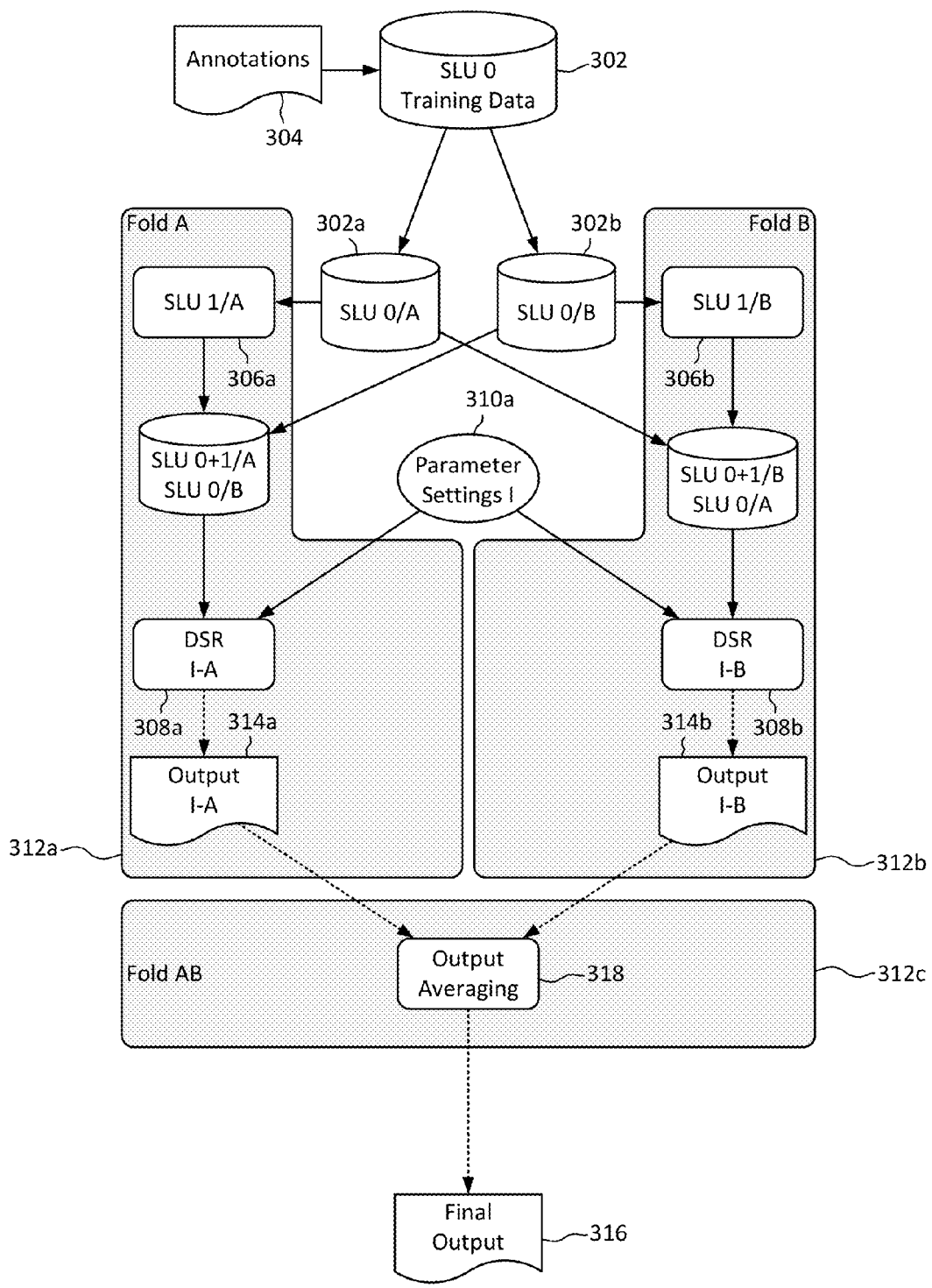

FIG. 3B is an extension of the training schematic of FIG. 3A expanded to show training of two folds. To maximize usage, the training data set parts 302a, 302b may be inverted and the training process repeated in arrangement designated fold B 312b. In other words, training data set part B 302b is used to train a second SLU model 306b, and training data set part A 302a is used to train a second dialog state scoring/ranking model 308b. The same training parameter set may be used to train the second dialog state scoring/ranking model 308b, as illustrated, or a different training parameter set may be used. The competing outputs 314a, 314b may be merged into a combined output 318 by averaging the scores to produce the final output 316.

The combination of the two folds is designated fold AB 312c. If a dialog state hypothesis is only generated by some of the folds, the dialog state tracking system 100 may treat the folds that did not generate the dialog state hypothesis as scoring the dialog state hypothesis with a zero for purposes of score averaging.

Figure 3C:
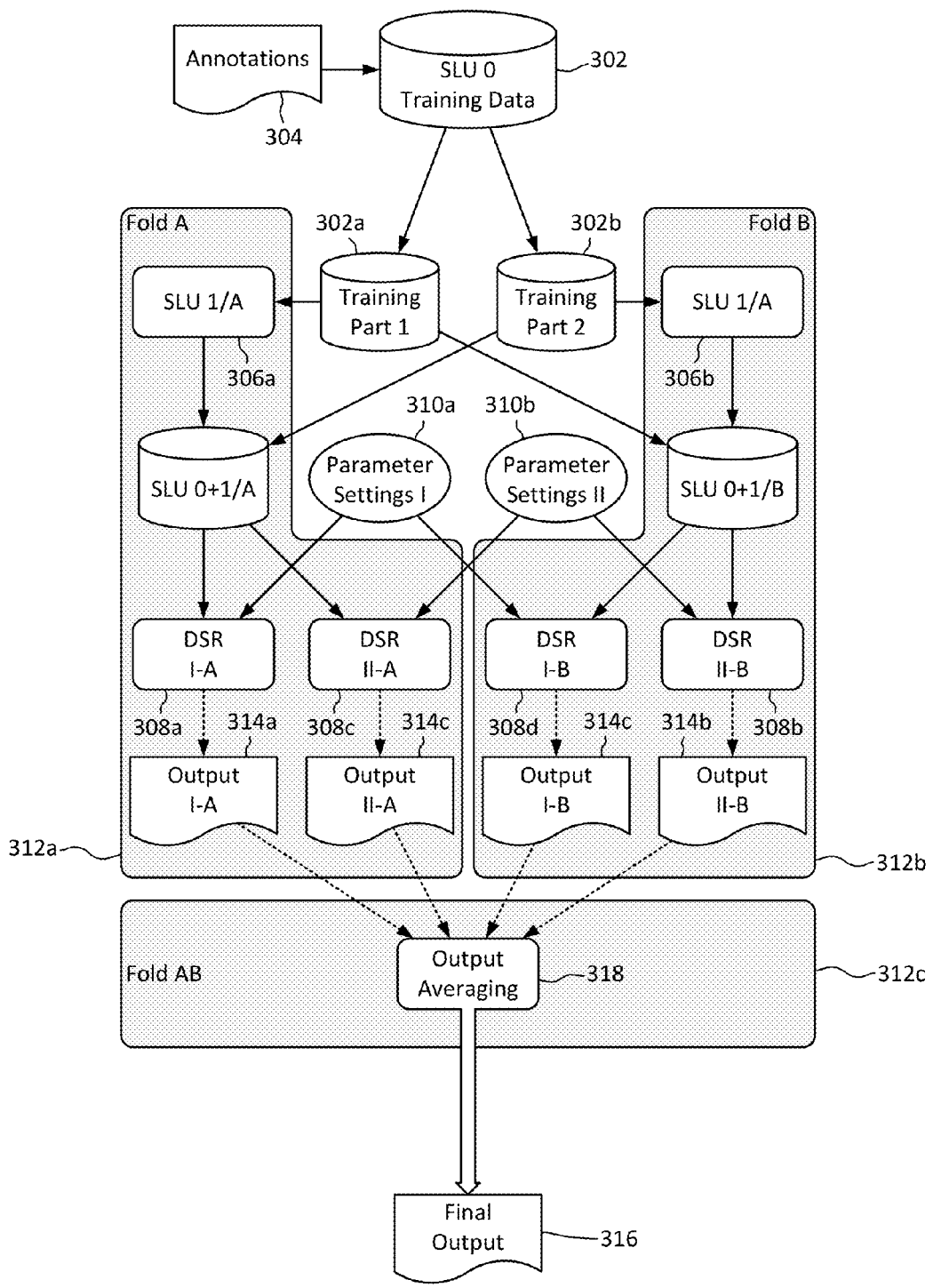

FIG. 3C is an extension of the training schematic of FIG. 3B expanded to show training of two DSRs per fold. By duplicating the training of the original dialog state scoring/ranking model 308a, 308b for each fold, but using a different training parameters 310b (e.g., a different number of leaves per tree), a second dialog state scoring/ranking model 308c, 308d may be built for each fold. Again, the training schematics show each pair of dialog state scoring/ranking models, one dialog state scoring/ranking model 308a, 308b from each fold, being trained using the same training parameters; however, different training parameter sets may be used to train some or all of the individual dialog state scoring/ranking models 308a, 308b. For example, each dialog state scoring/ranking model 308a, 308b may be trained using a different parameter set. As with the other outputs, the additional outputs 314c, 314d are merged into a combined output 318.

Another aspect is using more than one ASR to further improve the chance that the set of dialog state hypotheses will include the correct dialog state and to provide additional features for scoring the dialog state hypotheses. Some or all of the ASRs may use different recognition models to produce alternative recognition results feeding separate SLU engines using the same models to obtain comparative results. Alternatively, recognition results from one or more ASRs using the same recognition models may be distributed to separate SLU engines using different models to obtain comparative results. Further, a combination of ASRs using different recognition models feeding separate SLU engines using different models may be used to obtain comparative results.

Figure 4A:
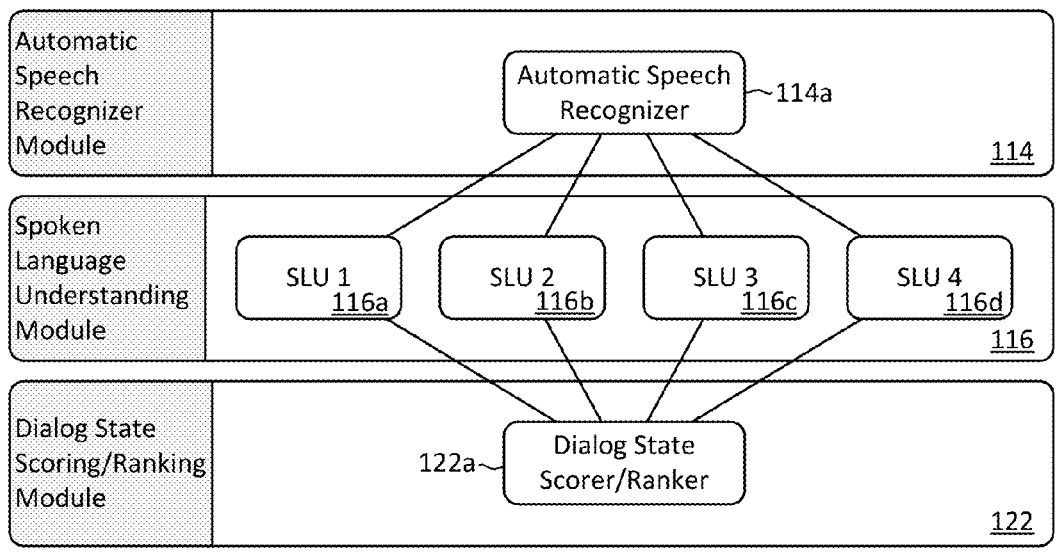
FIGS. 4A-C illustrate aspects of the dialog state tracking system employing multiple ASRs and/or SLU modules.
Figure 4B:
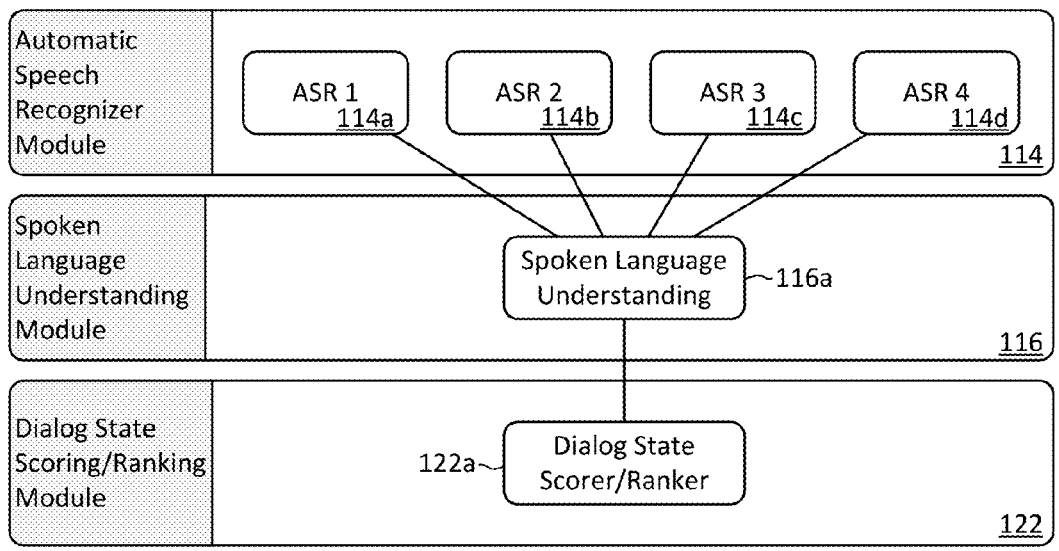
Figure 4C:
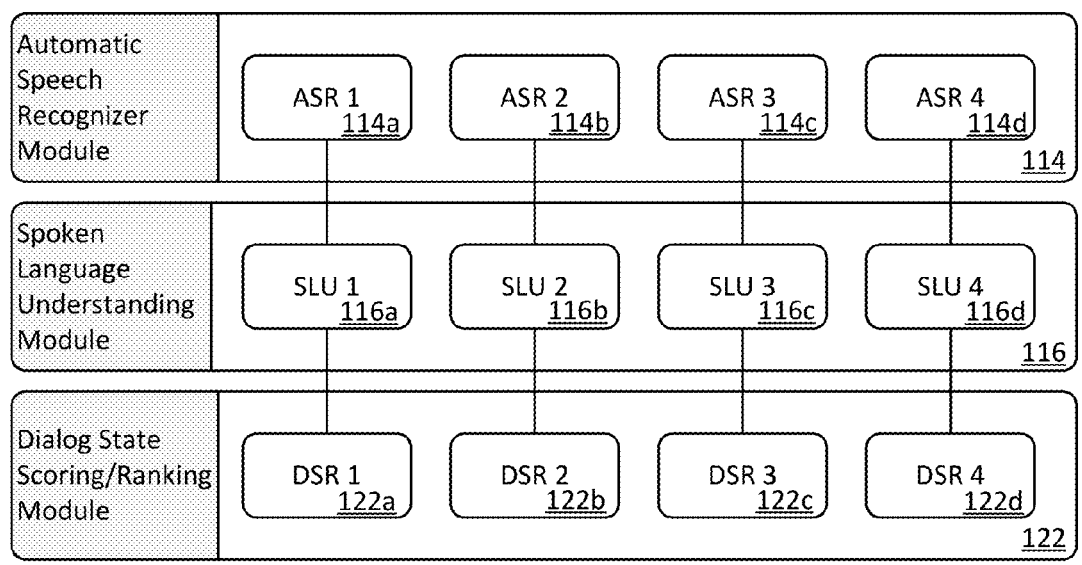

FIG. 4A illustrates aspects of the dialog state tracking system 100 where the ASRs 114 contains a single ASR engine 114a feeding multiple SLU engines 116a-d using different models and the outputs of the multiple SLU engines are merged and scored by a single DSR 122a. While each SLU module 116 receives the same inputs, the use of different models may produce different SLU results. When the results of all SLU engines 116a-d are combined, each unique result increases the size of the data set from which the dialog state hypotheses are generated. As the number of dialog state hypotheses increases, it becomes more likely that the set of dialog state hypotheses being tracked by the dialog state tracking system 100 contains the correct dialog state hypotheses. Conversely, if the correct dialog state hypotheses is not included in the set of dialog state hypotheses, it cannot be selected, which reduces accuracy, if not dooming the dialog state tracking system 100 to failure. FIG. 4B illustrates aspects of the dialog state tracking system 100 where the ASR module 114 contains a multiple ASR engines 114a-d feeding a single SLU engine 116a and a single DSR 122a. FIG. 4C illustrates aspects of the dialog state tracking system 100 where multiple ASRs 114a-d feed multiple SLU engines 116a-d, which in turn feed multiple DSRs 122a-d.

Two new SLU engines were built for use with the dialog state tracking system 100. Each SLU engine is made up of multiple binary classifiers accepting various input features from various sources. A binary classifier predicting the likelihood of the presence of the slot/value pair in an utterance is estimated for each slot/value pair. Another binary classifier is estimated for each user dialog act. The first SLU engine accepts word n-grams from an N-best list produced by the ASR, augmented with word class information. Augmenting with word class information results in a word sequence like "in the north part of town" produces features for both the original phrase and also the phrase with selected words replaced with the corresponding word class, e.g., "in the <LOCATION> part of town." The second SLU engine accepting word n-grams from a word confusion network in addition to the word n-grams from the ASR N-best list, again augmented with word class information.

Handling of word n-grams may vary based on the frequency of appearance in the training data. For example, word n-grams having a minimum appearance frequency, c, (i.e., appearing in the training data a minimum number of times) may be processed by the binary classifier while those word n-grams not meeting the minimum appearance frequency are mapped to a special UNK feature. The binary classifiers may be based, without limitation, decision trees, support vector machines (SVMs), and deep neural networks. Based on cross-validation, the SLU engines were trained to process word uni-grams and word bi-grams appearing at least twice in the training data (i.e., n=2 and c=2) as features. For the word confusion network, the second SLU engine was trained to process uni-grams as features. Bi-grams did not improve performance.

The top SLU output on the N-best list may be formed by taking the most likely valid combination of all binary classifiers. Each additional SLU output on the N-best list may be formed by successively taking the next most-likely valid combination of all binary classifiers. Invalid SLU combinations may not be considered when forming the SLU N-best list. For example, a proposed most-likely combination of dialog act that has no arguments and a slot/value pair would be skipped. Output scoring may be accomplished by the product of all binary classifiers and may incorporate some score smoothing.

The dialog state tracking system 100 is not limited to the new SLU engines described above. Other SLU engines may be built using different binary classifiers or input features. The SLU engines may accept one or more common input features from one or more common sources. The number of input features accepted may vary between SLU engines. Some SLU engines may also accept one or more input feature/source combinations that are not accepted by all other SLU engines. In other words, some SLU engines may accept at least one input feature/source combination that is not accepted by at least one other SLU engine.

An aspect of the dialog state tracking system 100 is the use of web-style (i.e., learning-to-rank) algorithms to build dialog state ranking models in place of conventional generative or discriminative dialog scoring methods. The objective of web-style ranking tasks is to order a set of N documents by relevance given a query. The input to a web-style ranking algorithm is a query Q and a set of documents $X=\{D_1, \ldots, D_N\}$, where each document is described in terms of features of that document and the query $\phi(D_i,Q)$. The output is a score for each document, where the highest score indicates the most relevant document. Dialog state ranking adapts web-style ranking to rank features associated with dialog states $\phi(X_i)$ instead of document features and queries $\phi(D_i,Q)$. Examples of suitable learning-to-rank algorithms that may be used to build dialog state ranking models include, but are not limited to, random forests of decision trees, boosted decision trees, multiple additive regression trees, and other web-style/learning-to-rank algorithms. A specific example of a learning-to-rank algorithm suitable for training a dialog state ranker is, without limitation, lambdaMART.

LambdaMART constructs a forest of decision trees. Each decision tree employs one or more binary branches that terminate at leaf nodes. Each binary branch specifies a threshold applied to a single input feature. Each leaf node is associated with a real value. Dialog states are scored using a weighted sum of the decision tree outputs. The training goal is to maximize ranking quality. One suitable measure of ranking quality is, without limitation, one-best accuracy, or how often the correct dialog state is ranked first. Training successively adds decision trees to the forest to improve ranking quality. For example, decision trees may be learned by regularized gradient decent. The number of decision trees, M, and the number of leaf nodes per decision tree, L, may be configured using tuning parameters. Using cross-validation, the present inventors found that 500 decision trees with 32 leaf nodes per decision tree produced excellent results (i.e., M=500 and L=32); however, other values may produce suitable or superior results.

The use of web-style ranking algorithms enables models incorporating feature conjunctions to be automatically built. Incorporating conjunctions in dialog state scoring has been shown to be improve dialog state tracking accuracy; however, conventional dialog state scoring methods require conjunctions to be hand-crafted. Hand-crafting feature conjunctions is not a scalable approach. Further, as dialog state tracking uses the entirety of the dialog to gather information used to infer the correct dialog state, the number of possible conjunctions increases exponentially as the number of dialog state hypotheticals and corresponding features grows. Leaving these problems aside, hand-crafting conjunctions is not practicable simply because it is difficult to predict in advance which conjunctions will improve dialog state tracking accuracy.

Figure 5:
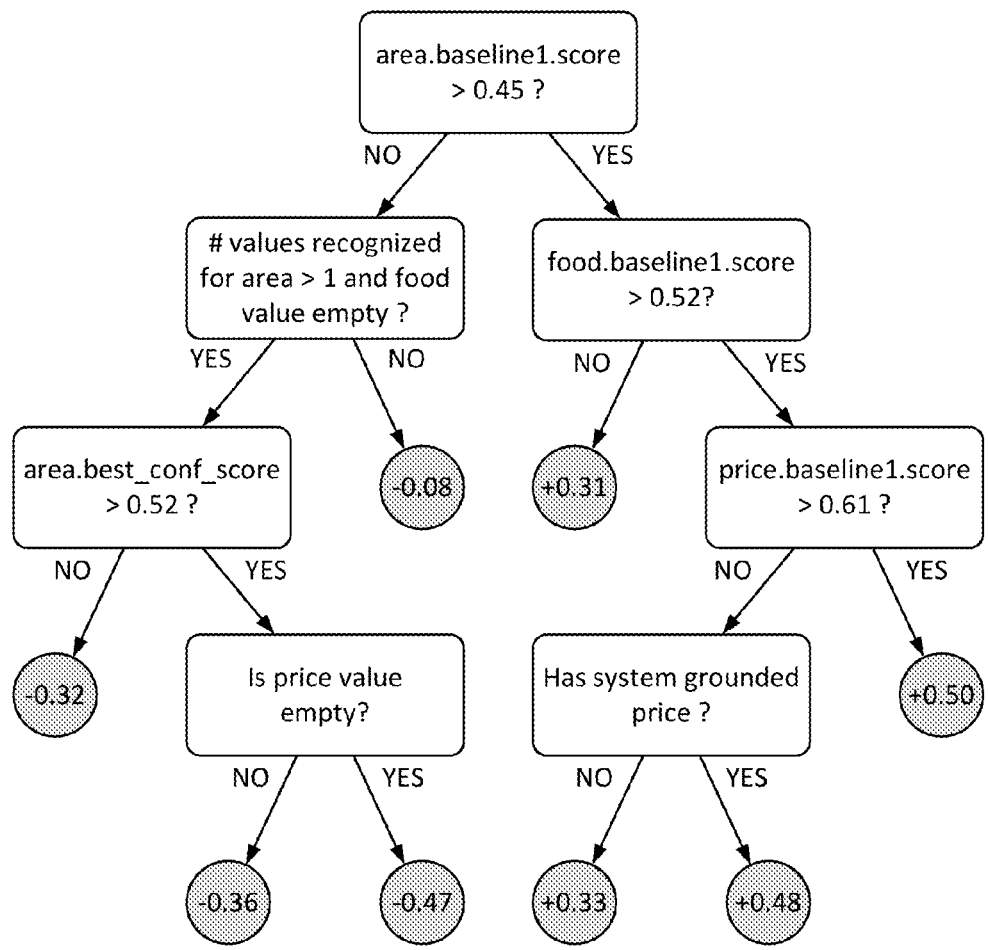
FIG. 5 illustrates an example of a single decision tree generated using a web-style ranking algorithm in accordance with aspects of the present invention.

FIG. 5 illustrates an example of a single decision tree generated using a web-style ranking algorithm in accordance with aspects of the present invention. Specially, the decision tree was generated using lambdaMART. This tree is in the restaurant search domain. Each branch (i.e., non-terminal node), represented by the rectangles, describes a binary test using a threshold applied to a feature. Each of the eight leaves (i.e., terminal nodes), represented by the circles, contains a real value that linearly contributes to the score of the dialog state being evaluated. The branching paths leading to a terminal node represent conjunctions of the features tested in the nonterminal nodes lying along the path. The complexity of the illustrated decision tree suggests that human designers would find it difficult to specify a tractable set of good conjunction features.

Figure 6A:
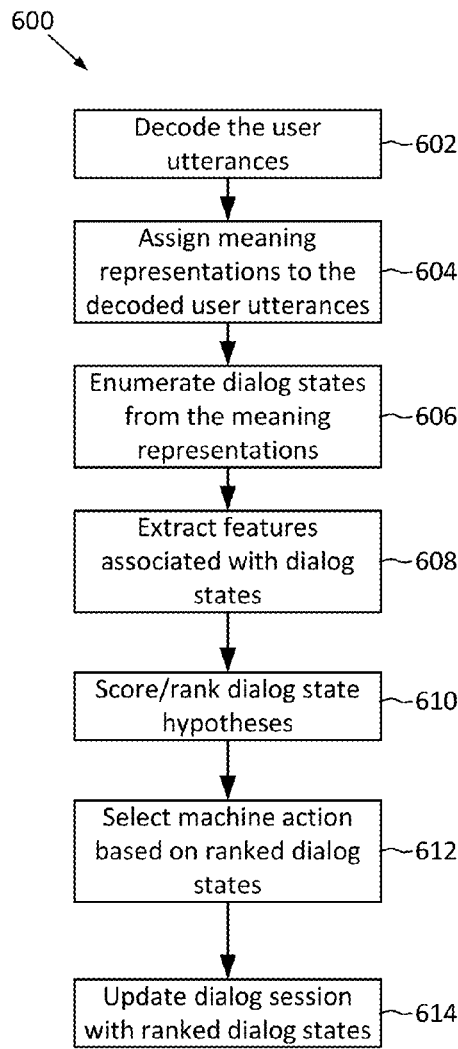
FIG. 6A is a high level flowchart illustrating aspects of a method for dialog state tracking performed by the system of FIG. 1.

FIG. 6A is a high level flowchart of a method of tracking dialog states incorporating aspects of the dialog state tracking system. The method 600 begins with decoding operation 602 which receives and decodes the user utterances provided as inputs to the dialog state tracking system 100. The decoding operation may be unnecessary in textual dialog systems. In spoken dialog systems, the decoding operation uses automatic speech recognizers to decode spoken utterances into words that may be processed by the dialog system 102. The decoding operation may produce a single decoded utterance or may provide multiple alternatives, for example, on an n-best list. The output may also include additional information such as recognition confidence scores. Aspects of the language understanding processing operation include the use of one or more input decoders (e.g., automatic speech recognitions).

A language understanding processing operation 604 assigns meaning representations to the decoded utterances. Language understanding processing may be accomplished using a wide variety of language understanding approaches. In spoken dialog systems, the language understanding may be accomplished using spoken language understanding processing techniques. The language understanding approaches may be based on hand-crafted or automatically generated rules and/or generative or discriminative statistical models. The language understanding processing operation may output a meaning representation or may provide multiple alternatives, for example, on an n-best list. The output may also include additional information such as confidence scores. Aspects of the language understanding processing operation include the use of one or more language understanding processors (e.g., spoken language understanding engines).

A dialog state enumeration operation 606 enumerates dialog state hypotheses from the meaning representations produced by the language understanding processing operation. For a single SLU output, U, the enumeration step is $X'=G(s, U, X)$, where U is a set of SLU hypotheses from a single SLU engine, X is the current set of dialog states, and X' is a new set of dialog state hypotheses to score. Multiple SLUs produce KSLU outputs, $U_1, \ldots, U_K$, and the enumeration step becomes $X'=G(s, U_1, \ldots, U_K, X)$. To accommodate this difference, the enumeration step of the dialog state tracking system 100 described herein may be adapted by taking the union of all concepts on all SLU N-best lists and enumerating dialog states from the union rather than the SLU outputs.

A feature extraction operation 608 extracts features from the enumerated dialog states, the dialog session, the meaning representations, and/or the decoded utterances. In a single SLU dialog system, the same features are always available. However, in a multiple SLU dialog system, there may be discrepancies in the features produced by the different SLU engines. For example, some features may not be supported by all SLU engines or a feature may be missing from the output of one or more SLU engines at any given turn. Accordingly, the feature extraction operation may be adapted to handle such situations.

The modified feature extraction operation outputs features derived from all of the SLU engines. By way of example, if a feature $\phi_j(x)$ includes information from a SLU engine, that information is duplicated K times, i.e., once for each SLU engine. Because a slot value may not output by all SLU engines, the dialog state tracking system 100 adds binary features to encode whether each SLU engine output the slot value of this dialog state. This accounts for situations where the feature $\phi_j(x)$ is not present for some SLU engines. Examples of such information that may or may not be available from all SLU engines when using multiple SLU engines include, without limitation, confidence scores and N-best list position.

A dialog state scoring/ranking operation 610 produces a set of ranked dialog states based on the extracted features. The set of ranked dialog states may include a single member (i.e., the top ranked dialog state) or multiple members depending upon the needs of the dialog system 102. A ranked dialog state set including multiple members may include all dialog state hypotheses or a subset of the dialog state hypotheses. For example, the ranked dialog state set may include a selected number of the highest ranked dialog states (e.g., an n-best list). The ranked dialog state set may include supplemental information with each ranked dialog state, such as, without limitation, the score given to the dialog state by the dialog state scoring/ranking operation. The dialog state scoring/ranking operation may use web-style ranking, as described herein, or conventional dialog state scoring approaches in multiple ASR/SLU dialog systems, such as described herein. In single ASR and SLU dialog systems, the dialog state scoring/ranking operation incorporates web-style ranking aspects. As previously discussed, the web-style ranking models used in the dialog state scoring/ranking operation 610 are built with learning-to-rank algorithms capable of automatically building conjunctions.

A machine action selection operation 612 determines what action the dialog system 102 should take next based on the output of the dialog state scoring/ranking operation. The machine action selection operation 612 may consider the distribution over the ranked dialog state set or, simply, highest ranked dialog state to determine the appropriate machine action. The machine action selection operation 612 may optionally incorporate the associated information (e.g., dialog state scores) in the decision. A dialog session update operation 614 updates the dialog session based on the output of the dialog state scoring/ranking operation.

Figure 6B:
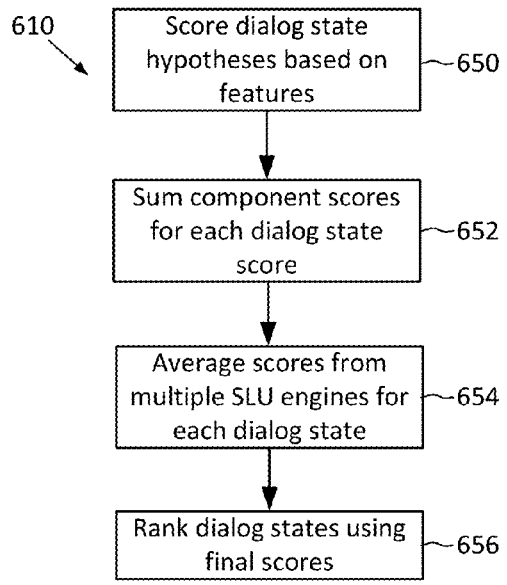
FIG. 6B is a flowchart of the dialog state scoring/ranking operation scoring dialog states using web-style ranking.

FIG. 6B is a flowchart of the dialog state scoring/ranking operation scoring dialog states using web-style ranking. The dialog state scoring/ranking operation 610 begins with a scoring operation 650 in which each decision tree of a web-style ranking algorithm outputs a score component for a dialog state based on the features and thresholds that make up the decision tree. A summing operation 652 scores the dialog states using a weighted sum of the decision tree outputs. For a forest of M trees, the score of a dialog state x is $$F(x) = \sum_{m=1}^{M} \alpha_m f_m(x) \quad (1)$$

where $\alpha_m$ is the weight of tree m and $f_m(x)$ is the value of the leaf node obtained by evaluating decision tree m using features $[\phi_1(x), \ldots, \phi_j(x)]$. In dialog systems having multiple SLU engines, an averaging operation 654 averages the dialog state scores from all SLU engines to produce a final score for each dialog state. In single SLU dialog systems, the weighted sum is the final score for each dialog state. A ranking operation 656 orders the dialog states based on the final dialog state scores.

The dialog state tracking system 100 may selectively incorporate some or all of the aspects described herein. For example, the dialog state tracking system 100 may employ a single-SLU engine in conjunction with web-style ranking algorithms for ranking dialog state hypotheses. Similarly, the dialog state tracking system 100 may employ a multiple-SLU engines with conventional dialog state scoring algorithms. The dialog state tracking system 100 may employ multiple-SLU engines and web-style ranking algorithms with or without multiple ranking parameter settings for each fold. The dialog state tracking system 100 may optionally incorporate multiple ASRs feeding a multiple-SLU engine dialog state tracker using conventional dialog state scoring algorithms or web-style ranking algorithms with or without multiple ranking parameter settings for each fold. In combination, the aspects described herein produced a dialog state tracking system 100 which showed a relative error reduction of 23% over a baseline which employed a single SLU and hand-coded rules for scoring.

The subject matter of this application may be practiced in a variety of implementations as systems, devices, and other articles of manufacture or as methods, such as hardware, software, computer readable media, or a combination thereof. The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
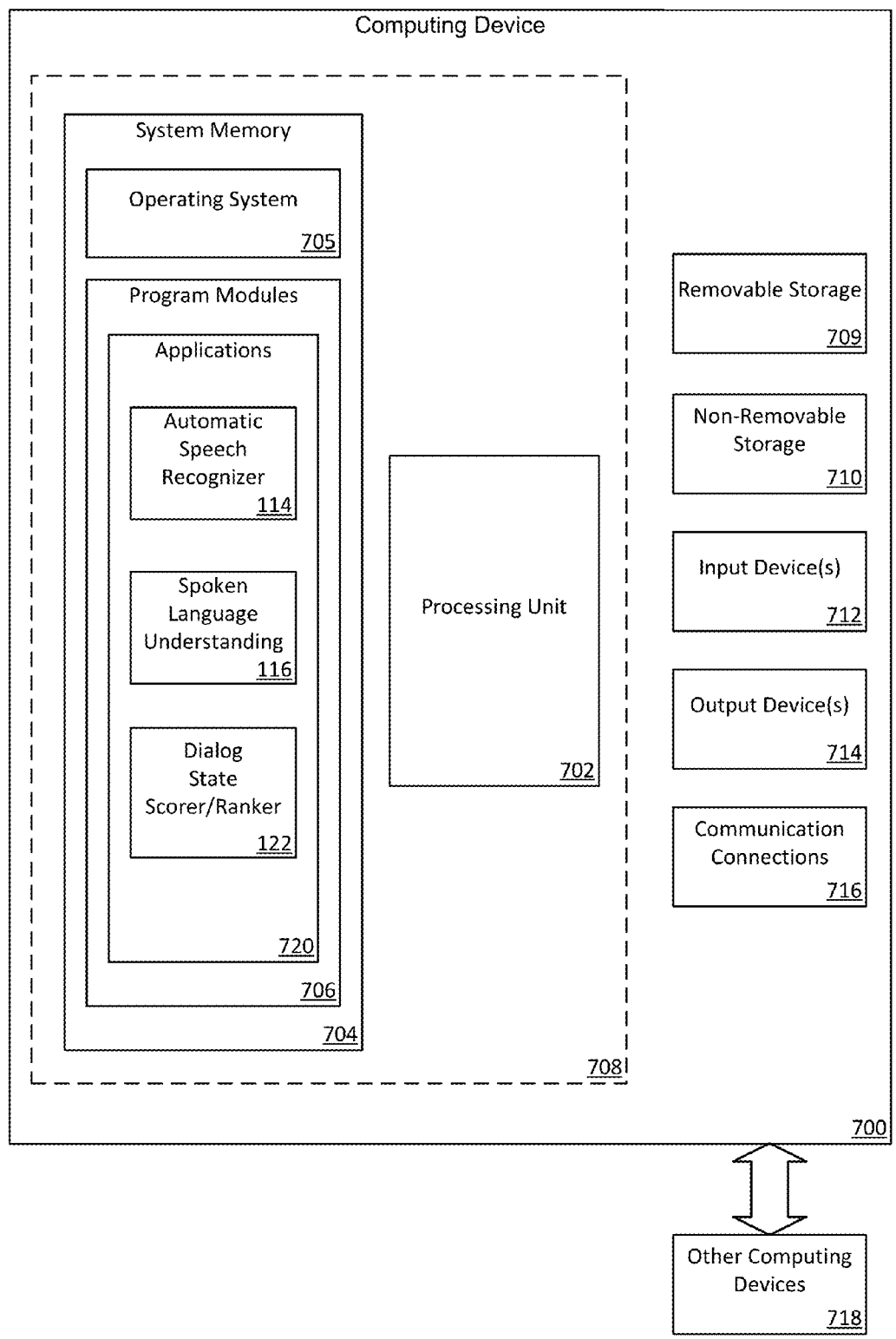
FIG. 7 is a block diagram illustrating physical components of a computing device suitable for practicing aspects of the present invention.
Figure 8A:
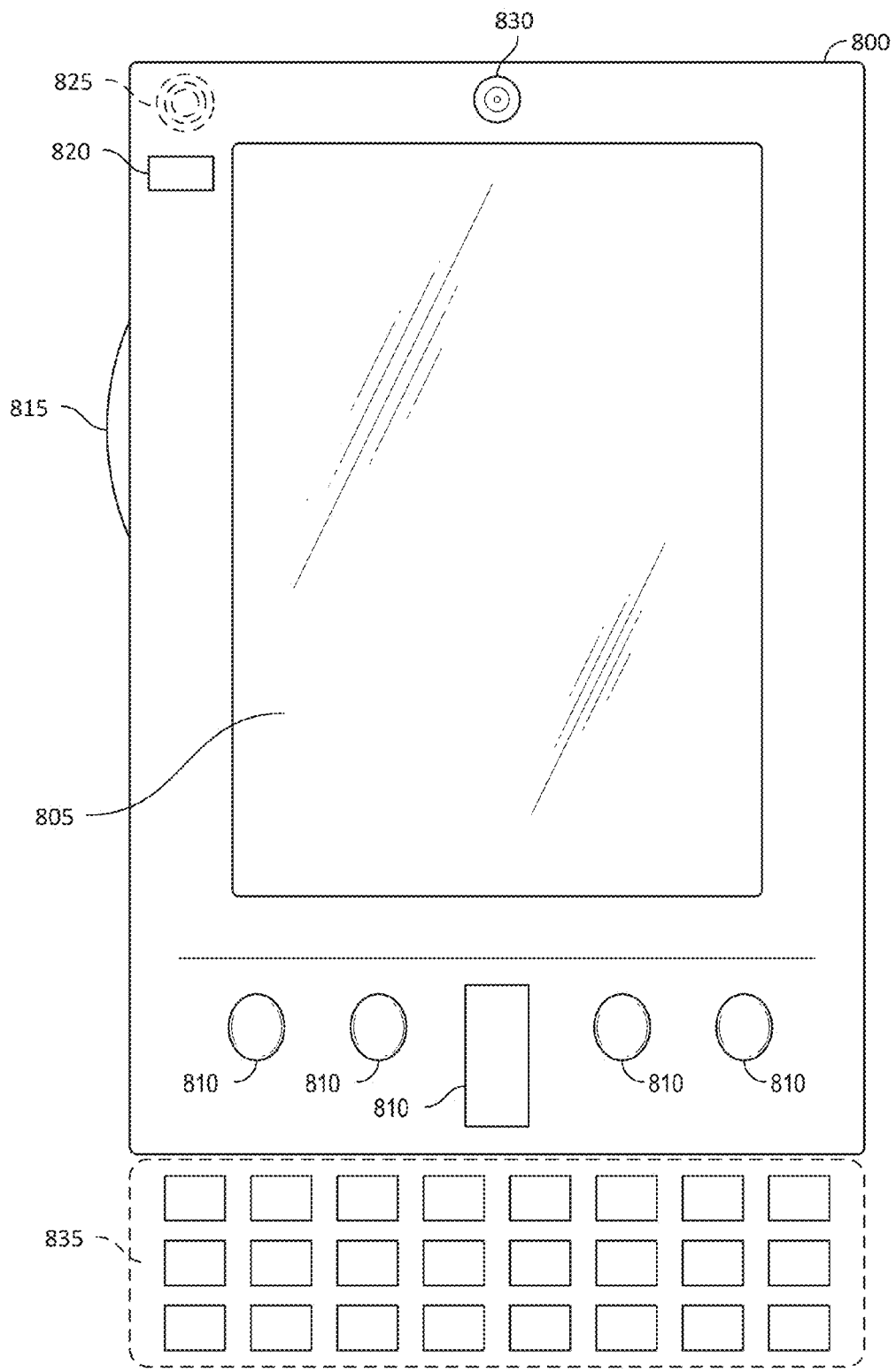
FIG. 8A illustrates a mobile computing device suitable for practicing aspects of the present invention.
Figure 8B:
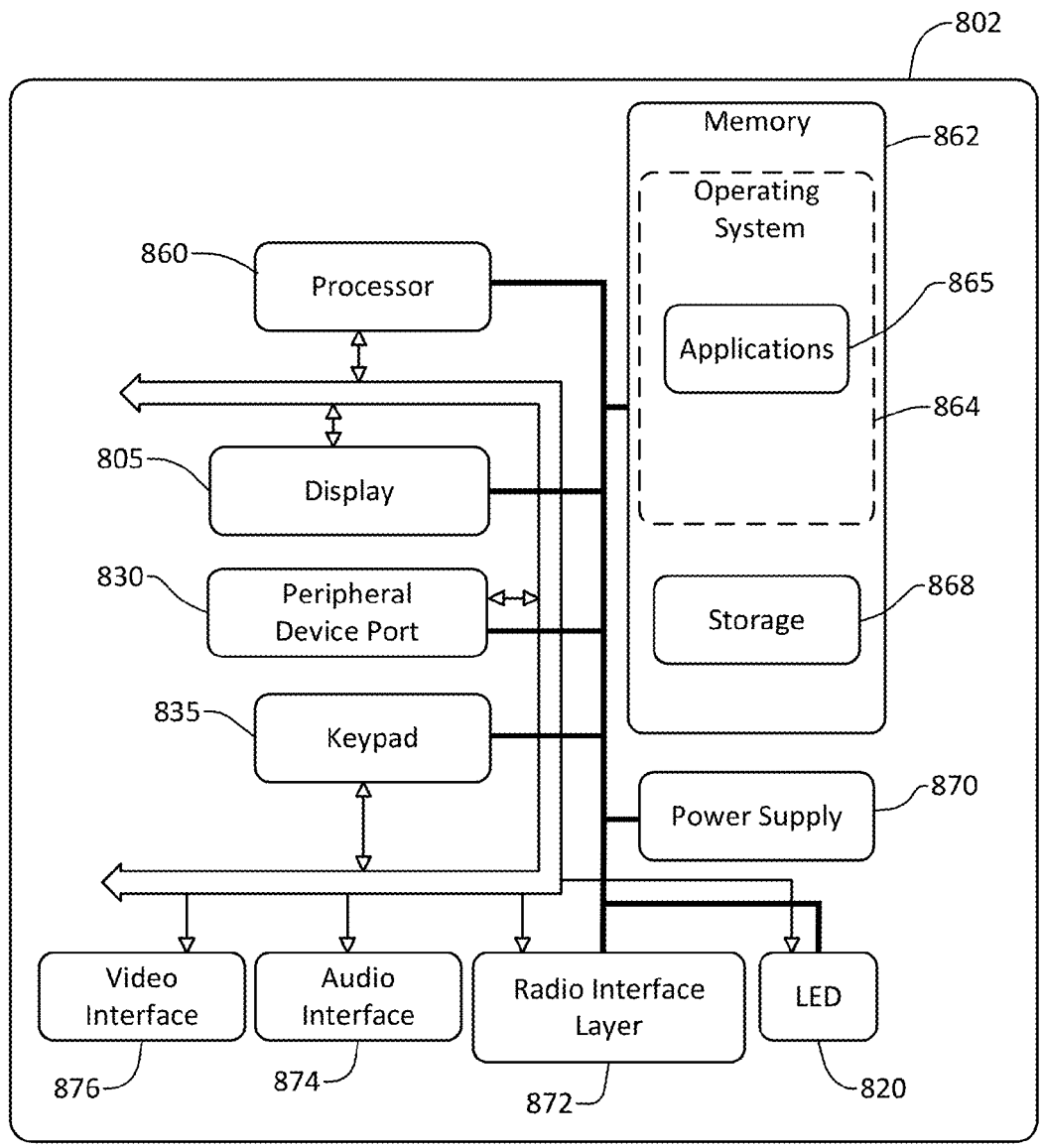
FIG. 8B is a block diagram illustrating an architecture for a mobile computing device suitable for practicing aspects of the present invention.
Figure 9:
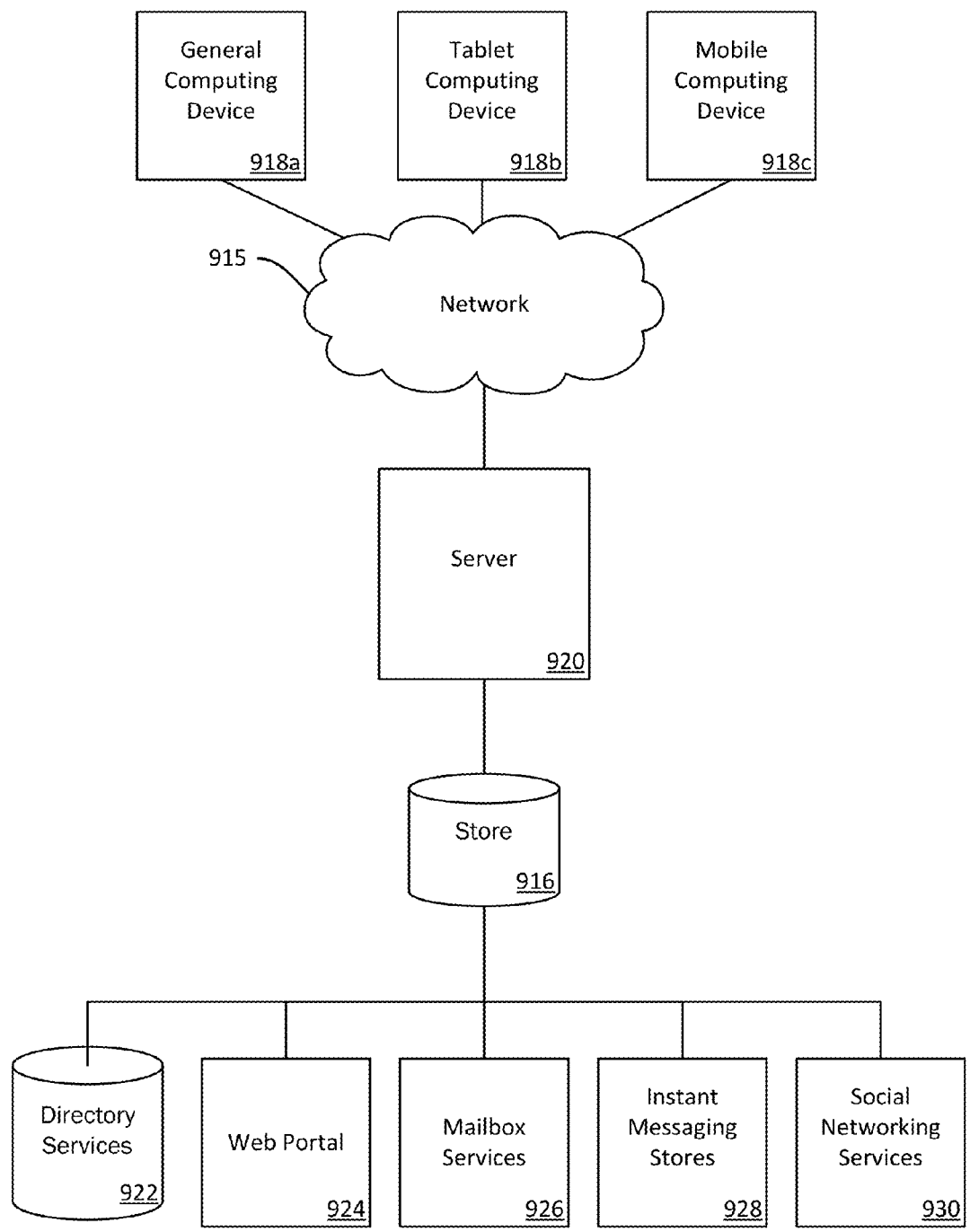
FIG. 9 is a simplified block diagram of a distributed computing system with which aspects of the present invention may be practiced.

FIGS. 7 through 9 and the associated descriptions provide a discussion of a variety of operating environments in which aspects of the invention may be practiced. However, the devices and systems illustrated and discussed are for purposes of example and illustration and are not limiting of a vast number of computing device configurations that may be utilized for practicing aspects of the invention described herein.

FIG. 7 is a block diagram illustrating physical components of a computing device suitable for practicing aspects of the present invention. The components of the computing device 700 may be suitable for embodying computing devices including, but not limited to, a personal computer, a tablet computer, a surface computer, and a smart phone, or any other computing device referenced herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the automatic speech recognition module 114, the spoken language understanding module 116, and the dialog state scorer/ranker module 122. For example, the operating system 705 may be suitable for controlling the operation of the computing device 700. Furthermore, aspects of the invention may be practiced in conjunction with a graphics library, other operating systems, or any other application program and is not limited to any particular application or system. This basic configuration is illustrated by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated by a removable storage device 709 and a non-removable storage device 710.

As stated above, a number of program modules and data files may be stored in the system memory 704. While executing on the processing unit 702, the software applications 720 may perform processes including, but not limited to, one or more of the stages of the dialog state tracking method 600. Other program modules that may be used in accordance with aspects of the present invention may include electronic mail and contacts applications, word processing applications, spreadsheet applications, database applications, slide presentation applications, or computer-aided drawing application programs, etc.

Furthermore, aspects of the invention may be practiced in an electrical circuit comprising discrete electronic elements, packaged or integrated electronic chips containing logic gates, a circuit utilizing a microprocessor, or on a single chip containing electronic elements or microprocessors. For example, aspects of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 720 may be operated via application-specific logic integrated with other components of the computing device 700 on the single integrated circuit (chip). Aspects of the invention may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

FIG. 8A illustrates a mobile computing device 800 suitable for practicing aspects of the present invention. Examples of suitable mobile computing devices include, but are not limited to, a mobile telephone, a smart phone, a tablet computer, a surface computer, and a laptop computer. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. The mobile computing device 800 may incorporate more or fewer input elements. For example, the display 805 may not be a touch screen. The mobile computing device 800 may also include an optional keypad 835. Optional keypad 835 may be a physical keypad or a "soft" keypad generated on the touch screen display. The output elements may include the display 805 for showing a graphical user interface, a visual indicator 820 (e.g., a light emitting diode), and/or an audio transducer 825 (e.g., a speaker). The mobile computing device 800 may incorporate a vibration transducer for providing the user with tactile feedback. The mobile computing device 800 may incorporate input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating an architecture for a mobile computing device suitable for practicing aspects of the present invention. That is, the mobile computing device 800 can incorporate a system (i.e., an architecture) 802 to implement some aspects of the present invention. The system 802 may be implemented as a smart phone capable of running one or more applications (e.g., browsers, e-mail clients, notes, contact managers, messaging clients, games, and media clients/players). The system 802 may be integrated as a computing device, such as an integrated personal digital assistant (PDA) and wireless phone.

One or more application programs 865 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 865 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including software applications 720 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the outside world via a communications carrier or service provider. Transmissions to and from the radio 872 are conducted under control of the operating system 864. In other words, communications received by the radio 872 may be disseminated to the application programs 865 via the operating system 864, and vice versa.

The visual indicator 820 may be used to provide visual notifications, and/or an audio interface 874 may be used for producing audible notifications via the audio transducer 825. For example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 is a simplified block diagram of a distributed computing system in which aspects of the present invention may be practiced. Content developed, interacted with, or edited in association with the software applications 720 may be stored in different communication channels or other storage types. For example, various documents may be stored using a directory service 922, a web portal 924, a mailbox service 926, an instant messaging store 928, or a social networking site 930. The software applications 720 may use any of these types of systems or the like for enabling data utilization, as described herein. A server 920 may provide the software applications 720 to clients. As one example, the server 920 may be a web server providing the software applications 720 over the web. The server 920 may provide the software applications 720 over the web to clients through a network 915. By way of example, the client computing device may be implemented as the computing device 700 and embodied in a personal computer 918a, a tablet computer 918b, and/or a mobile computing device (e.g., a smart phone) 918c. Any of these implementations of the client device 124 may obtain content from the store 916.

The description and illustration are intended to provide a complete thorough and complete disclosure the full scope of the subject matter to those skilled in the art and not intended to limit or restrict the scope of the invention as claimed in any way. The aspects, embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any aspect, embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternatives falling within the spirit of the broader aspects of the general inventive concept embodied in this application that do not depart from the broader scope of the claimed invention.

What is claimed is:

1. A method for improving dialog state tracking accuracy in a dialog system, the method comprising:
dividing a training data set into a plurality of parts, including a first part and a second part;
training a first spoken language understanding processor with the first part of the training data set;
training a first ranking processor with the second part of the training data set and a first training parameter set;
training a second spoken language understanding processor with the second part of the training data set;
training a second ranking processor with the first part of the training data set and a second training parameter set;
determining conversational inputs from spoken utterances received from a user, wherein the conversational inputs are determined by a plurality of automatic speech recognizers, wherein different recognition models are utilized by the automatic speech recognizers to produce conversational inputs that include alternative results;
determining meaning representations from the conversational inputs, wherein the meaning representations are determined by a plurality of spoken language understanding processors including the first spoken language understanding processor and the second spoken language understanding processor, wherein each of the spoken language understanding processors is operable to provide a meaning representation based on an individual model associated with each spoken language understanding processor;
enumerating dialog state hypotheses from the meaning representations;
extracting the features associated with each dialog state hypothesis using spoken language processing, wherein the features include confidence scores associated with each dialog state hypothesis;
ranking the dialog state hypotheses according to differences in the dialog state hypotheses and the confidence scores via the first ranking processor and the second ranking processor; and
using at least one member of the ranked set of dialog states hypotheses to determine what action the dialog system should take next.

2. The method of claim 1 characterized in that the act of ranking the dialog state hypotheses further comprises the acts of:
determining component scores for each dialog state hypothesis based on features associated with the dialog state hypothesis using a forest of decision trees;
computing a final score for each dialog state hypothesis from a weighted sum of the component scores; and
ranking the dialog state hypotheses based on the final score.

3. The method of claim 1 characterized in that the act of ranking the dialog state hypotheses further comprises the acts of:
enumerating a plurality of scores for each dialog state hypothesis using a plurality of dialog state ranking processors;
averaging the scores for each dialog hypothesis to produce a final score for each dialog hypothesis;
ranking the dialog state hypotheses based on the final score.

4. The method of claim 1 characterized in that the decision trees include cascading binary branches for leading to leaf nodes, each leaf node having a real value that is added to the score for a dialog state hypothesis when decisions of the binary branches based on features associated with the dialog state hypothesis lead to that leaf node.

5. The method of claim 4 characterized in that each binary branch applies a threshold to feature scoring features associated with the dialog state hypothesis.

6. The method of claim 1 further comprising the act of using a web-style ranking algorithm to automatically build ranking models having conjunctions.

7. The method of claim 6 characterized in that the web-style ranking algorithm is lambdaMart.

8. The method of claim 1, further comprising the acts of:
training a third ranking processor with the second part of the training data set and a third training parameter set, the third training parameter set being different than the first training parameter set; and
training a fourth ranking processor with the first part of the training data set and a fourth training parameter set, the fourth training parameter set being different than the second training parameter set.

9. The method of claim 1 characterized in that the features associated with each dialog state hypothesis include additional features derived from competitive outputs obtained by processing dialog state hypotheses using a plurality of spoken language processing processors.

10. The method of claim 1 characterized in that the conversational inputs are spoken utterances decoded using automatic speech recognition.

11. A dialog state tracking system comprising:
a processing unit; and
a memory including computer executable instructions which, when executed by a processing unit cause the system to provide:
an input device operable to collect conversational inputs from a user;
an input decoder in communication with the input device, the input decoder operable to convert the conversational inputs into computer readable text;
a plurality of automatic speech recognizers determining conversational inputs from spoken utterances received from a user, wherein different recognitions models are utilized by the automatic speech recognizers to produce conversational inputs that include alternative results;
a plurality of dialog state rankers, equal in number and paired with the plurality of automatic speech recognizers, where each pair is trained using a single training data set, wherein a spoken language understanding processor and a dialog state ranker in each pair are trained with different portions of the single training data set;
wherein the plurality of dialog state rankers and the plurality of automatic speech recognizers include a first pair and a second pair, wherein the spoken language understanding processor of the first pair and the dialog state ranker of the second pair are trained with one portion of training data set, and the spoken language understanding processor of the second pair and the dialog state ranker of the first pair are trained with a different portion of training data set;

a plurality of spoken language understanding processors in communication with the input decoder, each of the spoken language understanding processors operable to translate the computer readable text into a dialog state hypothesis based on an individual model for each spoken language understanding processor, the plurality of spoken language understanding processors outputting the features associated with each dialog state hypothesis using spoken language processing, wherein the features include confidence scores associated with each dialog state hypothesis; and a dialog manager operable to score each dialog state hypothesis based on differences in the dialog state hypotheses and the features associated with the dialog state hypothesis and select the highest scoring dialog state hypothesis as ranked via the first ranking processor and the second ranking processor as the correct dialog state.

12. The dialog state tracking system of claim 11 characterized in that the dialog manager uses web-style ranking to score each dialog state hypothesis.

13. The dialog state tracking system of claim 11 characterized in that dialog manager includes a plurality of dialog state rankers operable to score each dialog state hypothesis using a forest of decision trees including automatically built conjunctions.

14. The dialog state tracking system of claim 11 characterized in that the conversational inputs are spoken utterances and the input decoder includes an automatic speech recognizer operable to decode the spoken utterance into computer readable text.

15. The dialog state tracking system of claim 11 characterized in that the input decoder comprises a plurality of automatic speech recognizers, each automatic speech recognizer in communication with one or more of the spoken language understanding processors.

16. A computer readable storage device containing computer executable instructions which, when executed by a computer, enable the computer to perform a method of improving dialog state tracking accuracy in a human-computer interaction system, comprising:

dividing a training data set into a plurality of parts, including a first part and a second part;

training a first spoken language understanding processor with the first part of the training data set;

training a first ranking processor with the second part of the training data set and a first training parameter set;

training a second spoken language understanding processor with the second part of the training data set;

training a second ranking processor with the first part of the training data set and a second training parameter set;

determining conversational inputs from spoken utterances received from a user, wherein the conversational inputs are determined by a plurality of automatic speech recognizers, wherein different recognition models are utilized by the automatic speech recognizers to produce conversational inputs that include alternative results;

determining meaning representations from the conversational inputs, wherein the meaning representations are determined by a plurality of spoken language understanding processors, wherein each of the spoken language understanding processors is operable to provide a meaning representation based on an individual model associated with each spoken language understanding processor;

enumerating dialog state hypotheses from the meaning representations;

determining scores for each dialog state hypothesis based on dialog state hypothesis features using multiple dialog state ranking processors, each dialog state ranking processor having a forest of decision trees including automatically built conjunctions;

averaging the scores from each dialog state ranking processor to produce a final score for each dialog state hypothesis;

ranking the dialog state hypotheses based on the final scores via the first ranking processor and the second ranking processor; and updating a dialog session with the highest ranking dialog state hypothesis.

17. The computer readable storage device of claim 16, wherein the computer is further enabled by the instructions for:

training a third ranking processor with the second part of the training data set and a third training parameter set, the third training parameter set being different than the first training parameter set; and training a fourth ranking processor with the first part of the training data set and a fourth training parameter set, the fourth training parameter set being different than the second training parameter set.

18. The computer readable storage device of claim 16, wherein the computer uses a web-style ranking algorithm to automatically build ranking models having conjunctions.

19. The computer readable storage device of claim 18, wherein the web-style ranking algorithm is lambdaMART.

20. The computer readable storage device of claim 16, wherein the first part of the training data set and the second part of the training data set divide the training data set into substantially equal parts.

* * * * *